Patented Oct. 21, 1941

2,260,173

UNITED STATES PATENT OFFICE 2,260,173

PRODUCTION AND APPLICATION OF MEDIA FOR PROTECTION FROM LIGHT

Max Dohrn, Berlin-Charlottenburg, and Hans Nahme, Berlin-Zehlendorf, Germany, assignors to Sherka Chemical Co. Inc., Bloomfield, N. J., a corporation of New York No Drawing. Application July 1, 1939, Serial No. 282,472. In Germany July 11, 1938

8 Claims. (Cl. 167—90)

This invention relates to the production and application of media for protection from light.

The hitherto known media for protection from light can according to their solubility in water and oil be divided into two groups. The water soluble media to which belong for example sodium umbelliferone acetate, the quinine salts and the salicylic acid esters of polyhydric alcohols, have the disadvantage that in their application as skin protecting agent they are immediately removed again by the body perspiration or by bathing, a property which much reduces their value as media for protection from the sun. The oil soluble media, for example salicylic acid menthyl ester, certainly have not this disadvantage but on the other hand they are oily and can accordingly only be used in liquid form, that is to say as oil, or in oil solution or emulsion, for example as paste in conjunction with ointment bases; in this form they not only give the skin an unsightly shine but also render it sticky so that their use for example on the beach has very important disadvantages owing to adhering of sand.

The present invention is based on the discovery that the valuable properties of media for protection from light and ointment bases can be combined with avoidance of their disadvantages when such esters of organic acids which absorb ultra-violet rays are employed as are water-insoluble and at ordinary temperature have a waxlike consistency. As alcoholic components of these esters are particularly suitable fat, wax and resin alcohols. Such esters possess after melting and solidifying again externally the properties of solid soaps of matt wax-like consistency and can be used without any addition or with the admixture of ointment bases, softening agents, perfumes, dyestuffs or other customary additions, for example in the form of sticks customarily used for shaving-soap, compact powders or the like, by simple rubbing on the skin. They can also be employed in fine crystalline form as powder without further additions or also with admixture of customary powder constituents; also without additions these powders can very easily be rubbed on homogeneously and invisibly without causing the slightest shine.

As acid constituent of the esters according to the invention are suitable for example salicylic acid, umbelliferone acetic acid or 2,6-dichloro-pyridine-4-carboxylic acid and others; as alcohol constituents are suitably employed lauryl or cetyl alcohol, octadecanol or cholesterol, further the wax alcohol mixture containing principally cetyl alcohol and known under the trade name "Lanette wax," abietinol and others. It is also possible to employ other alcohols provided that they form with the acids solid esters with the above mentioned properties. Particularly valuable esters are the cetyl and octadecanol esters of salicylic acid, 1- or 3-oxy-2-naphthoic acid, umbelliferone acetic acid, 2,6-dichloro-pyridine-4-carboxylic acid, of which the esters of 2,6-dichloro-pyridine-4-carboxylic acid find application with advantage owing to the fact that in contradistinction to other light protecting agents they do not fluoresce and therefore even by prolonged irradiation do not become weaker in their absorption effect.

The new esters are produced from the mentioned alcohols and acids or acid derivatives by the methods customary for the production of esters.

The following examples illustrate the manufacture of the new esters:

Example 1

Equimolecular quantities of cetyl alcohol and 2,6-dichloro-pyridine-4-carboxylic acid chloride are combined together whereby with evolution of hydrochloric acid the esterification takes place. By gentle heating on the steam bath the reaction is completed. The mixture is taken up with ethyl acetate, if desired filtered and then introduced into methanol. The 2,6-dichloro-pyridine-4-carboxylic acid cetyl ester separates out in fine needles which on grinding feel between the fingers like talcum (M. P. 48°).

The ester can also be purified by distillation (B. P. 280–283° C. under 16 mm.). On distillation it solidifies in the receiver and forms a wax-like mass which can also be ground to a fine powder.

The powder can be used in the known manner for cosmetics, for example, either for a compact powder which consisted in the main point of chalk and talcum containing about 17% ester, or for sticks, consisting mainly of "Lanette-wax" under addition of paraffine and containing about 20% ester.

Example 2

Salicylic acid chloride is combined with the equivalent quantity of cetyl alcohol and gently heated. By recrystallisation of the reaction mixture from dilute alcohol crystals of slight odour are obtained of the salicylic acid cetyl ester of M. P. 48° C.

The same substance is obtained by re-esterification from oil of wintergreen.

Example 3

By re-esterification of umbelliferone acetic acid ethyl ester with cetyl alcohol there is obtained the cetyl ester of umbelliferone acetic acid which recrystallised from ethanol melts at 50-52° C.

Example 4

2,6-dichloro-pyridine-4-carboxylic acid octodecanol ester is produced in an analogous manner to Example 1 from the corresponding acid chloride and octadecanol. It melts at 59° C.

Example 5

By conversion of 1-oxy-2-naphthoic acide chloride with cetyl alcohol in a solution of chloroform 1-oxy-2-naphthoic acid cetyl ester is produced, which, recrystallized of diluted alcohol or acetic ester, melts at 50-51°.

Example 6

2,6-dichloro-pyridine-4-carboxylic acid cholesterol ester is obtained according to Example 1 from the corresponding acid chloride and cholesterol. It melts at 139° C.

Example 7

2,6-dichloro-pyridine-4-carboxylic acid lauryl ester is produced according to Example 1 from the corresponding acid chloride with lauryl alcohol. It melts at 31° C.

The esters mentioned in Examples 6 and 7 are less useful for the purpose in view alone owing to their high or low melting point respectively. They are excellently suited, however, as admixture to the materials mentioned for example under Examples 1-5 if it is necessary to raise or lower the melting point.

The esters produced according to the Examples 2-7 are worked into cosmetics, as described for example in Example 1.

Obviously also other methods of production can be used than those described.

The new compounds are not only intended to serve as media for protection from light in order to prevent sunburn, but they can also find application in any other form when it is desired to protect light sensitive materials from the short wave rays. Thus they can be added to suitable carrier substances, for example films of artificial resins, plastic cellulose derivatives, gelatine and the like. It is also possible to saturate wrapping materials, such as paper, textiles and others with a solution of the specified esters in suitable solvents and in this manner to protect the objects provided with such a wrapping material from the effect of injurious rays.

In this manner a foil of acetylcellulose of 0.01 mm. thickness, containing, for example, 0.5 mg. of ester per sq. cm. according to Example 1, protects from the influence of injurious constituents of daylight.

The main advantage of the new media is, however, to be recognised in the above mentioned application for cosmetic purposes since they exhibit the specified new properties which none of the media hitherto used for these purposes possesses.

Having now particularly described and ascertained the nature of our said invention and in what manner the same is to be performed, we declare that what we claim is:

1. A composition for protection from sunlight containing therein a sufficient amount to give such protection of a solid ester of wax-like consistency, said ester being the reaction product of an acid taken from the group consisting of salicylic, umbelliferone acetic, dichloro-pyridine-carboxylic, and oxy-naphthoic, with an alcohol taken from the group consisting of lauryl, cetyl, octadecanol, cholesterol, and abietinol.

2. A composition for protection from sunlight comprising an ointment base containing therein a sufficient amount to give such protection of a solid ester of wax-like consistency, said ester being the reaction product of an acid taken from the group consisting of salicylic, umbelliferone acetic, dichloro-pyridine-carboxylic, and oxy-naphthoic, with an alcohol taken from the group consisting of lauryl, cetyl, octadecanol, cholesterol, and abietinol.

3. A composition for protection from sunlight, being a cosmetic powder containing therein a sufficient amount to give such protection of a solid ester of wax-like consistency, said ester being the reaction product of an acid taken from the group consisting of salicylic, umbelliferone acetic, dichloro-pyridine-carboxylic, and oxy-naphthoic, with an alcohol taken from the group consisting of lauryl, cetyl, octadecanol, cholesterol, and abietinol.

4. A film of material taken from the class consisting of artificial resins, plastic cellulose derivatives, gelatine, paper, and textiles, containing therein a sufficient amount to give protection from sunlight of a solid ester of wax-like consistency, said ester being the reaction product of 2.6 dichloro-pyridine-4-carboxylic acid with an alcohol taken from the group consisting of lauryl, cetyl, octadecanol, cholesterol, and abietinol.

5. A film of material taken from the class consisting of artificial resins, plastic cellulose derivatives, gelatine, paper, and textiles, containing therein a sufficient amount to give protection from sunlight of a solid ester of wax-like consistency, said ester being the reaction product of an acid taken from the class consisting of salicylic, umbelliferone acetic, dichloro-pyridine-4-carboxylic and oxy-napthoic with an alcohol taken from the group consisting of lauryl, cetyl, octadecanol, cholesterol, and abietinol.

6. The cetyl alcohol ester of 2.6-dichloro-pyridine-4-carboxylic acid.

7. The octadecyl alcohol ester of 2.6-dichloropyridine-4-carboxylic acid.

8. The cetyl alcohol ester of umbelliferone acetic acid.

MAX DOHRN.
HANS NAHME.